United States Patent [19]

Chang

[11] Patent Number: 4,941,944

[45] Date of Patent: Jul. 17, 1990

[54] METHOD FOR CONTINUOUS COUNTERCURRENT OGRANOSOLV SACCHARIFICATION OF COMMINUTED LIGNOCELLULOSIC MATERIALS

[75] Inventor: Robert P. Chang, Burnaby, Canada

[73] Assignee: Pierre A. Tonachel, New York, N.Y.

[21] Appl. No.: 460,042

[22] Filed: Jan. 2, 1990

Related U.S. Application Data

[63] Continuation of Ser. No. 712,784, Mar. 18, 1985, abandoned.

[30] Foreign Application Priority Data

Jul. 13, 1984 [CA] Canada .................................. 458893

[51] Int. Cl.⁵ .............................................. D21C 3/20
[52] U.S. Cl. ........................................ 162/19; 127/37; 162/72; 162/76; 162/77
[58] Field of Search ................. 162/19, 72, 77, 76; 127/37; 435/161, 163

[56] References Cited

U.S. PATENT DOCUMENTS

| | | | |
|---|---|---|---|
| 3,200,032 | 8/1965 | Richter et al. | 162/19 |
| 3,413,189 | 11/1968 | Backlund | 162/237 |
| 3,585,104 | 6/1971 | Kleinert | 162/77 |
| 4,409,032 | 10/1983 | Chang et al. | 162/72 |
| 4,470,851 | 9/1984 | Paszner et al. | 162/72 |
| 4,496,426 | 1/1985 | Baumeister | 162/77 |
| 4,520,105 | 3/1985 | Sinna et al. | 162/77 |

FOREIGN PATENT DOCUMENTS 1100266  5/1981  Canada .

Primary Examiner—Steve Alvo
Attorney, Agent, or Firm—Ian C. McLeod

[57] ABSTRACT

A method for the continuous countercurrent production of lignins and sugars from wood and other ligno cellulosic materials by organosolv delignification or saccharification at elevated temperatures and pressures is disclosed. The novel method comprises: (a) continuously introducing comminuted lignocellulose materials with a natural mositure content into a reaction vessel from one end; (b) continuously introducing a cooking liquor comprising a major proportion of organic solvent, a minor proportion of water, and a slight amount of inorganic acid countercurrently into the reaction vessel from the opposite end; (c) causing the comminuted lignocellulosic material to be contacted by the cooking liquor; and (d) continuously withdrawing cooking liquor from the reaction vessel after it has commingled with and has dissolved sugars and lignin and other substances from the comminuted lignocellulosic material.

14 Claims, 3 Drawing Sheets

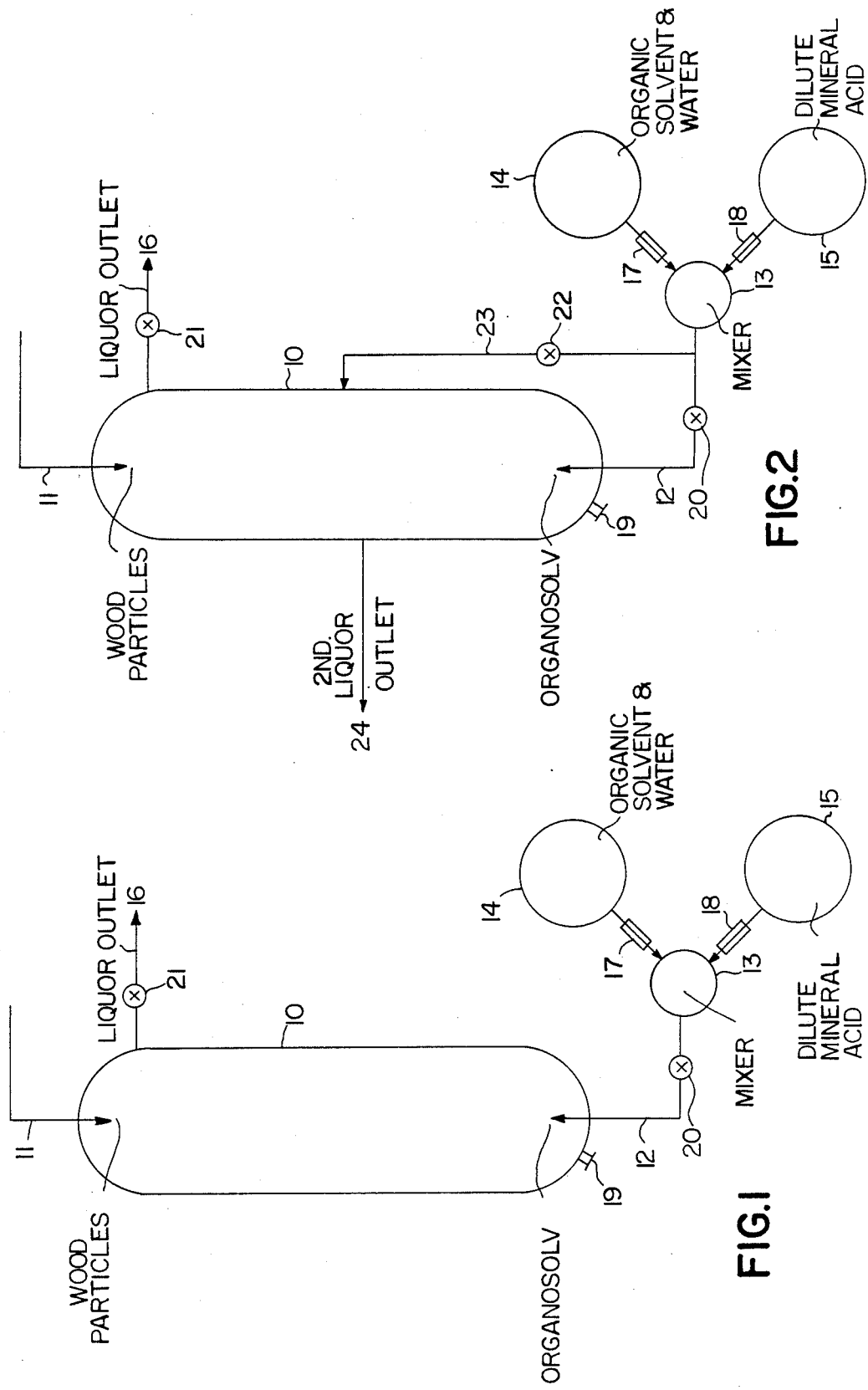

4,941,944

METHOD FOR CONTINUOUS COUNTERCURRENT OGRANOSOLV SACCHARIFICATION OF COMMINUTED LIGNOCELLULOSIC MATERIALS

This is a continuation of application Ser. No. 212,784 filed on Mar. 18, 1985, now abandoned.

FIELD OF THE INVENTION

This invention is directed to a novel method for the continuous countercurrent dissolution of wood and other lignocellulosic materials by organosolv delignification or saccharification at elevated temperatures and pressures.

BACKGROUND OF THE INVENTION

To date, it has not been possible to rapidly and quantitatively solubilize and recover chemical components from lignocellulosic materials on an economic basis. The literature describes various organosolv processes for delignification and saccharification of lignocellulosic materials and vegetable crops. In general, such processes involve the use of a mixture of water and a solvent such as an alcohol or a ketone of a limited polar nature along with an acidic compound to encourage the hydrolysis action. Known processes have been characterised by poor delignification ability, slow hydrolysis rates and extensive sugar conversion into undesirable non sugars, mainly furfurals and organic acids. Condensed lignins obtained from such processes are of a highly condensed form and are not usually suitable for chemical processing.

U.S. Pat. No. 1,856,567, Kleinert et al., 1932, teaches the use of aqueous alcohol at elevated temperatures for production of cellulose pulp in a pressure vessel using small quantities of acids or bases as delignification aids. Treatment is described in terms of three hour steps, which is too long for commercial exploitation.

Conventional hydrolysis processes for delignification and saccharification of lignocellulosic materials using water and acid suffer the following drawbacks.

1. Most lignin is not solubilized and is further condensed to a solid mass that cannot be used for the manufacture of chemicals. This mass adds a complication in that it absorbs sugars dissolved in the liquor. The sugars can be removed only by extensive washing.

2. During the process there is virtually no delignification reaction. This reduces the accessibility of the liquor to the carbohydrate and hence reduces the rate of hydrolysis.

3. The hydrogen ion has a high affinity to the polar water molecule. This reduces the catalytic effect of the hydrogen ion on the carbohydrate.

It is believed that utilizing an organic solvent of low affinity to a hydrogen ion together with water and acid at high temperature and pressure facilitates simultaneous dissolution of lignin and carbohydrate, and intensifies the catalytic effect of the acid. This process overcomes many drawbacks of the conventional hydrolysis process. However, the much increased dissolution rate of wood components is offset somewhat by a relatively short working time available to compete with the decomposition of the dissolved compounds to undesirable degraded products.

Rapid removal of the desirable dissolved compounds would provide a method of minimizing the undesirable decomposition effect. This can be easily done in a batch process. But to date, there have been many difficulties to overcome in developing a method to provide continuous rapid removal of dissolved compounds before appreciable degradation takes place. Some of the difficulties to be overcome have been that a large excess amount of expensive liquor is required to promote a complete reaction and high energy cost is incurred in recovering the liquor products through evaporation.

U.S. Pat. No. 4,409,032, wherein I am one of the inventors, describes a process for continuous saccharification and delignification of wood using acetone and water mixture with small amounts of acid and rapid cooling after saccharification. Rapid cooling is used to prevent degradation of the saccharification products. My copending U.S. application Ser. No. 347,238, filed Feb. 9, 1982 now U.S. Pat. No. 4,470,851 describes a related process using higher proportions of acetone. This U.S. application and patent are related to Canadian application Ser. No. 395,820, filed Feb. 9, 1982 and Canadian Patent No. 1,100,266. These methods work very well but improvement was needed.

SUMMARY OF THE INVENTION

The present invention relates to a method for continuous organosolv treatment of a comminuted lignocellulose material containing naturally occurring water in a reaction vessel, wherein the lignocellulose material is contacted at elevated temperatures with a mixture of an organic solvent, water and a catalytic amount of an acid as a cooking liquor which facilitates the dissolution of the lignocellulose material, the improvement which comprises:

(a) introducing the lignocellulosic material into the vessel through a first inlet in countercurrent flow to the cooking liquor such that in a first zone of the vessel mainly lignin and hemicellulosic sugars are dissolved from the lignocellulosic material leaving a remaining cellulose and such that in a second zone of the vessel spaced from the first zone mainly oligomeric sugars are formed from the remaining cellulose;

(b) introducing the cooking liquor through a second inlet into the second zone in the vessel in countercurrent flow to the lignocellulosic material at a first temperature $T_1$ in the vessel and removing the cooking liquor in the first zone from a first outlet from the vessel at a temperature $T_2$ lower than $T_1$, wherein the water in the comminuted lignocellulosic material introduced into the first zone dilutes the cooking liquor and contributes to the reduction of temperature from $T_1$ to $T_2$ for dissolution of the lignin and hemicelluloses in the first zone which are removed from the first zone through the first outlet; and (c) rapidly cooling the cooking liquor after removing the cooking liquor from the vessel. As used herein the term "mainly" means that in a particular zone the primary reaction is the one indicated. This does not mean that there cannot be other reactions. Further, the "zones" can be adjacent to each other or they can be separate. If desirable, the reactor can be disposed horizontally at an angle.

Thus I have invented a novel and useful method of and apparatus for continuously rapidly hydrolyzing or saccharifying comminuted lignocellulosic materials by using a countercurrent organosolv process at elevated temperatures and pressures. The solubilizing medium or cooking liquor comprises a major amount of an aqueous organic solvent mixture which is blended with a highly dilute mineral acidic compound at elevated reaction temperatures in the range 150° C. to 210° C. The hot cooking liquor is continuously contacted with the comminuted lignocellulose materials in the apparatus for a time typically ranging from 1 to 5 minutes from inlet to outlet. The resulting cooking liquor incorporating the dissolved material is rapidly cooled in order to prevent undesirable degradation of the dissolved materials. The ratio of organic solvent to comminuted lignocellulosic materials ranges from 5:1 to 15:1, preferably, a ratio of about 7:1.

The invention is preferably directed to a method of dissolving lignin and cellulosic substances from comminuted lignocellulose material at elevated temperatures and pressures comprising: (a) continuously introducing comminuted lignocellulose material into a reaction vessel from one end; (b) continuously introducing a cooking liquor comprising a major proportion of organic solvent, a minor proportion of water, and a slight amount of inorganic acid countercurrently into the reaction vessel from the opposite end; (c) causing the comminuted cellulosic material to be contacted by the cooking liquor wherein the flow of cooking liquor is countercurrent to the flow of lignocellulosic material; (d) continuously withdrawing cooking liquor from the reaction vessel after the liquor has commingled with the comminuted cellulosic material and has dissolved cellulose and lignin and other substances from the comminuted lignocellulosic material and rapidly cooling the cooking liquor.

The method is conducted at temperatures ranging from 150° C. to 210° C., preferably about 200° C. The proportion of organic solvent in the cooking liquor introduced into the reaction vessel is precisely between about 70 to 90 percent by weight of the cooking liquor, preferably about 80 percent by weight of the cooking liquor. The remainder of the cooking liquor is water (about 10 to 30 percent) and mineral acid (typically 0.02 to 1.0N HCl.)

The water content of the comminuted lignocellulosic material introduced into the reaction vessel may be in the range of about 30 to 70 percent by weight of the comminuted lignocellulose material. The ratio by weight of cooking liquor to comminuted lignocellulosic material introduced into the reaction vessel may be in the range 5:1 to 15:1, preferably about 7:1.

The cooking liquor and the comminuted lignocellulosic material are introduced into the reaction vessel so that the flow of each is countercurrent to the other to maximize interaction between the comminuted cellulose and the cooking liquor and to obtain pentose sugars and lignin under relatively mild conditions in one part of the reactor (zone 1 of FIGS. 1, 2 or 3) and hexoses under more severe conditions in the other part of the reactor (zone 2 of FIGS. 1, 2 or 3). This is accomplished by having the different reaction zones illustrated in FIGS. 1, 2 or 3 in the reactor which have different reaction conditions and thus produce different reaction products. To minimize undesirable side reactions involving the solvent and the acid in the cooking liquor, it is advisable not to mix the acid with the solvent and water mixture until immediately prior to the introduction of the cooking liquor into the reactor.

BRIEF DESCRIPTION OF THE DRAWINGS

In the drawings which disclose particular embodiments of the method and apparatus of this invention:

FIG. 1 represents a flow chart depicting a reactor vessel wherein comminuted lignocellulosic material is fed into one end of the reactor and cooking liquor liquid is introduced in the other end of the reactor;

FIG. 2 represents a flow chart wherein a fixed blend of cooking liquor liquid is introduced into the reaction vessel at two locations;

DETAILED DESCRIPTION OF THE INVENTION

Process Objectives and Characteristics

Figure 3:
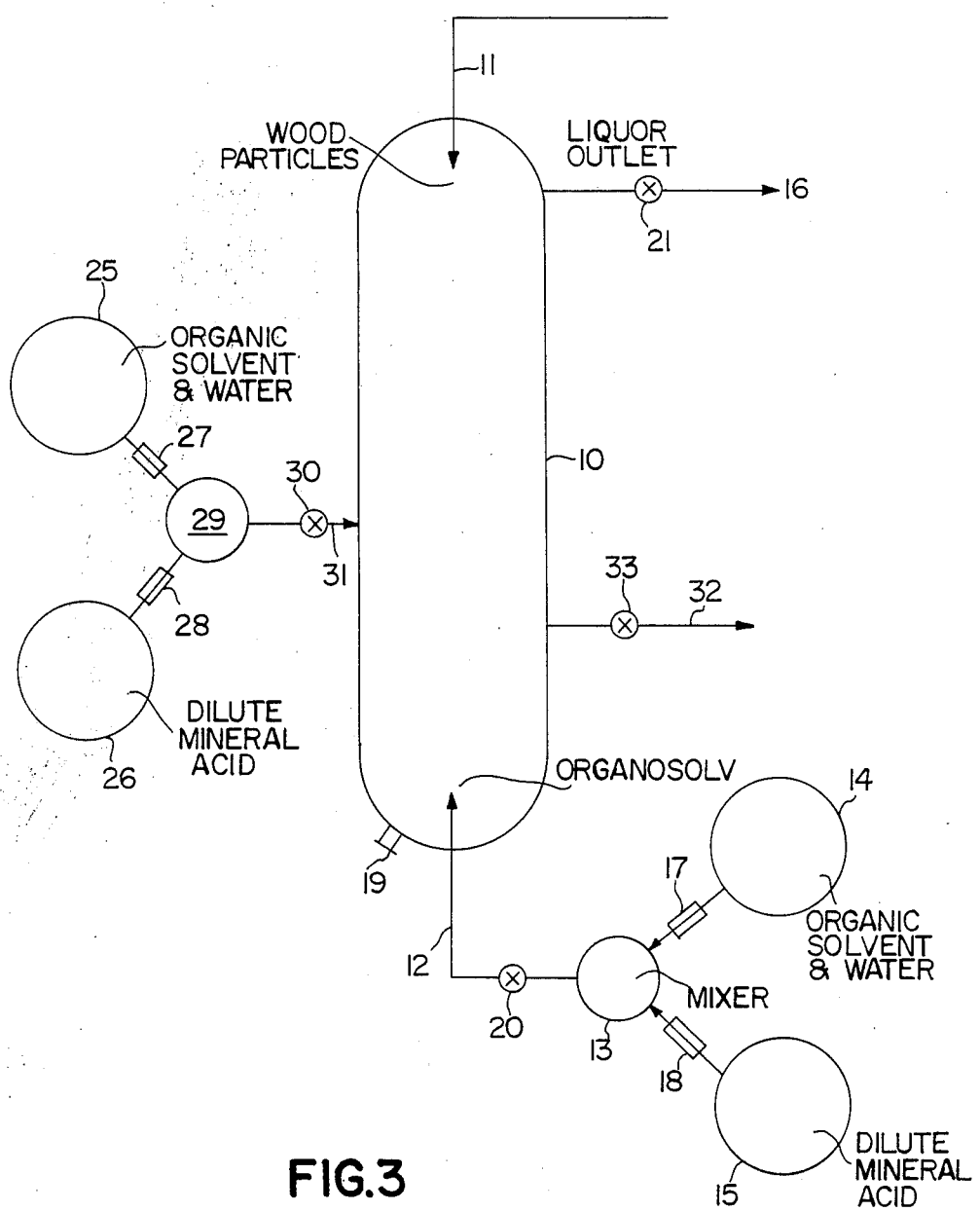
FIG. 3 represents a flow chart wherein cooking liquors of two different concentrations are introduced into the reaction vessel at two locations.

In order to provide a process which is commercially attractive and economically feasible, the following process and apparatus objectives and characteristics must be satisfied.

1. Promoting rapid dissolution of lignocellulosic materials by cooking liquor.

2. Promoting a reasonably slow rate of degradation of oligomeric sugars relative to the rate of dissolution of lignocellulosic materials to oligomeric sugars in order to maximize the rate of production of desirable oligomeric sugars and minimize the rate of production of undesirable degraded products.

3. To minimize undesirable degradation, the residence time of the cooking liquor containing dissolved oligomeric sugars must be reasonably short. In absolute terms, the rate of degradation is rapid and thus once the cooking liquor has dissolved a reasonably large amount of ligno cellulosic material, the cooking liquor must be removed and cooled within a short period of time in order to minimize degradation.

4. The overall size of the reactor must be balanced with the input flow of cooking liquor and comminuted lignocellulosic materials, and the rate of withdrawal of liquor containing dissolved oligomeric sugars in order to maximize lignocellulose dissolution and minimize the production of degraded products.

5. The ratio of cooking liquor to comminuted cellulosic material must be within economic limits. A high ratio of organosolv to comminuted lignocellulose material would perform efficiently, but would be uneconomic because large volumes of expensive cooking liquor would be used. Conversely, a high ratio of comminuted lignocellulose material to cooking liquor, while economic, would not function satisfactorily because a long residence time would be required in order to dissolve a reasonable amount of the comminuted lignocellulose material, and hence degradation of products is a problem.

DETAILED DESCRIPTION OF AN EMBODIMENT OF THE INVENTION

FIG. 1 depicts a countercurrent reactor 10, with auxiliary equipment. Reactor 10 consists of an elongated vertical liquid-medium reaction chamber or vessel into which comminuted lignocellulosic materials, such as wood chips, sawdust and the like, are introduced under elevated pressures and temperatures by means of inlet 11 at the top of the reaction chamber 10. Cooking liquor at high temperature, typically in the range 150° C. to 210° C., but preferably at about 200° C., is introduced into the base of the reactor 10 by means of organosolv inlet line 12. Cooking liquor containing dissolved lignins, sugars, hydrolyzed cellulose, and other dissolved materials, is extracted from the reactor 10 by means of liquor outlet line 16. A screen (not shown) can be located at the inlet of line 16 to prevent undissolved comminuted materials being withdrawn through line 16 or there can be a separation and recycle loop from and back to the reaction (not shown). A valve 21 controls the rate of withdrawal of liquor through outlet line 16.

The cooking liquor introduced into the base of the reactor 10 by means of inlet line 12 is composed typically of 80 percent by weight organic solvent, 20 percent by weight water, and a small concentration of mineral acid, typically, 0.02 to 1.0 Normal.

The organic solvent and the majority of the water making up one component of the cooking liquor is retained in tank 14. Dilute mineral acid is held in tank 15. The organic solvent and water is heated in heat exchanger 17 while the dilute acid in tank 15 is heated in heat exchanger 18 before being blended with one another according to prescribed ratios in mixer 13. The blended cooking liquor from mixer 13 is introduced into the base of reactor 10 by means of inlet line 12. It is important that the organic solvent and water mixture is held separate from the mineral acid until immediately prior to mixing and introduction into the reactor 10 in order to minimize the opportunity for undesirable chemical side reactions to take place between the organic solvent and the mineral acid. Thus the length of the inlet line 12 from the mixer 13 to the reactor 10 should be as short as possible so that the mixed cooking liquor is introduced into the reactor 10 quickly. A valve 20 regulates the flow of cooking liquor through line 12. Alternatively, or in addition, metering pumps 34 can be used to regulate the flow of the cooking liquor.

Temperatures in reactor 10 are typically 180° C. at the top region, and 200° C. at the bottom region. In the top portion of the reactor 10, the reaction conditions are relatively mild due to increased water content, that is, lower acid concentration of the countercurrent liquor at the top portion of the reactor 10. The increased water concentration in the cooking liquor comes from water inherent in the fresh comminuted lignocellulosic material introduced into the top of reactor 10. Typically, for example, wood chips carry 30 percent to 70 percent by weight water, unless the wood chips are dried. In my process, the comminuted cellulosic material is not dried prior to being introduced into the reactor 10.

To minimize the tendency of the organosolv to channel or tunnel through the wood particles, and to ensure good interaction between the organosolv and the woodchips, baffles and other conventional flow regulating, mixing and guiding devices (not shown) can be installed in the interior of the reactor 10 as it is known to those skilled in the art of countercurrent reactors.

Temperatures in the top portion of the reactor 10 are generally lower due to natural heat loss through the walls of the reactor 10, and the introduction of the relatively cold comminuted lignocellulosic material. In the top portion of the reactor 10 (in zone 1), lignin is removed from the comminuted wood material and hemicellulose is hydrolyzed to soluble sugars. The degree of degradation of the relatively vulnerable hemicellulose sugars present in the mixture is relatively low due to the relatively mild conditions in the upper region of the reactor 10.

In the lower regions of the reactor 10 (in zone 2), the reaction conditions are more severe. The organic solvent is more concentrated, not having been partially diluted by water present in the wood chips. Higher temperatures exist in the lower regions, typically in the range 200° C. In the lower regions, the crystalline cellulose is hydrolyzed to soluble monomeric sugars (the majority being hexoses and in particular glucose) and soluble oligomeric sugars. Such sugars are more resistant to degradation and thus can withstand higher reactor temperatures.

The sequence of reaction mechanisms for dissolving the lignocellulosic materials and incurring further reactions in solution can be described in simple terms as follows:

1. Dissolution by hydrolysis of the lignocellosic materials into various desirable soluble sugars; and,
2. Degradation of the various desirable soluble sugars to undesirable degradation products.

In operating the reactor 10, and in order to achieve the desired dissolution rates (that is, maximize reaction 1 above), it is important to balance various reaction and flow rate parameters. It has been found that high concentrations of organic solvent, typically 80 percent by weight organic solvent, with a minor amount of mineral acid acting as a catalyst (for example, 0.02N HCl), at reaction temperatures in the range 150° C. to 200° C., hydrolyze cellulose at a rapid rate. While I do not wish to be bound to any theories, it appears that the high concentration of organic solvent encourages the transfer of protons to cleave the acetal linkage in the cellulose, thereby producing a hemiacetal which dissolves in the cooking liquor.

At more dilute concentrations, typically 30 to 60 percent by weight organic solvent, lignin dissolution is encouraged in preference to cellulose hydrolysis. The key, therefore, is to control the ratio between these respective processes in order to achieve the desired balance of cellulose hydrolysis and lignin dissolution.

Water content inherent in the comminuted wood material generally adds a complicating factor in prior art processes because it dilutes the organic solvent concentration thereby reducing cellulose hydrolysis activity. However, this difficulty is overcome automatically because the water content in the wood material is removed at the top of the reactor through the liquor outlet 16 in the process of the present invention.

In pursuing my process, it is important as discussed previously to carefully control the rate of sugar degradation (reaction 2 above) so as not to yield a high quantity of undesirable degraded lignin material. It is also important to rapidly cool the cooking liquor taken from the upper region of the reactor 10 by means of outlet 16, in order to minimize degradation rates. This prevents the degradation of the sugars.

In operation, when wood particles are introduced in the reactor, for example, the size of the wood particles tends to classify according to a relatively smooth gradient throughout the elevation of the reactor. The larger less dissolved particles are usually found in the top regions (zone 1) of the reactor 10 while the smaller more dissolved particles are found in the lower regions (zone 2) of the reactor 10. The packing density of the particles is increased from larger particle area to smaller particle area. This encourages high packing density which minimizes reactor 10 size and consequently liquor requirement.

From time to time it may be necessary to withdraw from the reactor 10, trace elements, ash and other undissolved waste products in order to maintain process operating equilibriums within the reactor 10. A solid drain valve 19 therefore should be located at the bottom of the reactor. The drain valve 19 is removed when it is necessary to remove accumulated solids from the reactor. As a procedure alternative to utilizing a drain valve 19, the same purpose can be achieved without interrupting the basic process by using a flushing technique. At required intervals, the bottom of the reactor can be flushed by introducing a strong flushing fluid such as hydrochloric acid into the bottom of the reactor 10. The hydrochloric acid will dissolve and remove trace metals such as calcium and magnesium, and other undissolved products and convert them to soluble chlorides. Since such metals and waste products are heavy, they are likely to collect in the lowest region of the reactor. Accordingly, the flushing acids should be introduced at the lowest region of the reactor, for example, through inlet 12. Any solid material which is not dissolved by the flushing process, can be extracted by withdrawing the drain valve 19 from the reactor.

In my process, it is permissible to use any organic solvent provided the solvent has a polarity below the polarity of water and is miscible with water at the reaction temperatures employed, typically from approximately 150° C. to 210° C.

Typically, in practising my method, the ratio of cooking liquor introduced through inlet 12 into the lower region of reactor 10 is seven times by weight the volume of the cellulosic material which is introduced into the upper region of the reactor 10 by means of inlet 11. However, the weight proportion of the cooking liquor to the lignocellulosic material can range from 5:1 to 15:1. Typically, once operating conditions are reached, about 50 percent of the lignocellulose mass introduced into the upper region of the reactor 10 is dissolved and removed by means of outlet 16 in less than one minute of the time of introduction into the reactor 10. The remainder dissolves according to first order kinetic principles. A normal half life for the particles after the initial rapid one minute dissolution rates is less than 5 minutes depending on reaction conditions.

As an alternative to the single cooking liquor inlet 12, single liquor outlet 16 method, fresh cooking liquor may be introduced in the lower part of the reactor 10 (zone 2) and may leave the reactor 10 at a mid-point after having hydrolyzed all or almost all highly ordered cellulose in the lignocellulosic material to hexoses. Fresh cooking liquor with a higher water content and at a lower temperature can be introduced into the reactor 10 at a location closer to the upper portion of the reactor 10 (zone 1) and can leave the reactor 10 charged with lignin and hydrolized hemicellulose sugars by means of outlet 16 causing less severe reaction conditions. A reactor hook-up similar to that illustrated in FIG. 2 may be suitable for such an alternative process. As can be recognized, concentrated cooking liquor at various temperatures can be introduced into the reactor 10 at two or more locations in the reactor 10 in order to achieve desired reaction conditions and regulate the ratios of lignin dissolution to cellulose hydrolysis and dissolution of other substances such as sugars and the like, in the liquor which may leave the reactor 10 at two or more points.

Referring to FIG. 2, cooking liquor from the mixer 13 may be introduced both through inlet 12 and at a convenient mid-point in the reactor 10 through inlet line 23. A valve 22 controls the flow of cooking liquor through line 23. Introducing fresh cooking liquor through line 23 will create stronger reaction conditions at a mid-region in the reactor 10. In order to prevent degradation of the sugars dissolved in the liquor, a second liquor outlet 24 is taken off the reactor 10 at a point below the point of introduction of the fresh cooking liquor into the reactor 10 through inlet 23. With two inlet lines 12 and 23 into the reactor 10, and two liquor outlet lines 16 and 24 from the reactor 10, it is important to balance the volumes of cooking liquor into the reactor 10 through inlets 12 and 23 with the volume of liquor taken out of the reactor 10 through the two outlet lines 16 and 24, and also maintain a balance with the wood particles which are introduced into the reactor 10 through inlet 11.

In the process and apparatus illustrated in FIG. 2, the cooking liquor introduced into the reactor 10 at two locations is of the same strength. In certain situations, it may be advisable or advantageous to introduce cooking liquor into the reactor as two or more locations, but the strength and temperature of the cooking liquor should not necessarily be the same at the two points of introduction. FIG. 3 illustrates a reactor 10 hook-up which can be utilized for introducing cooking liquor at two locations in the reactor 10 with the cooking liquor being of different strengths and temperatures at the two points of introduction. Referring to FIG. 3, it can be seen that two separate cooking liquor mixing systems are used. In addition to the first cooking liquor mixing system which has been illustrated in FIGS. 1 and 2, a second mixing system comprising organic solvent and water tank 25, dilute mineral acid tank 26, a second mixer 29, and respective heat exchangers 27 and 28, heat, mix and introduce cooking liquor of a strength different from that produced by mixer 13, into the reactor 10 by means of inlet 31. A valve 30 regulates the flow of the second cooking liquor through inlet line 31. A secondary liquor outlet 32, regulated by valve 33, is taken off a mid-point of the reactor 10.

If it is desirable to introduce cooking liquor of various strengths at three or more locations of the reactor 10, then similar independent cooking liquor mixing systems can be added to the overall process and apparatus accompanied with separate inlets. Likewise, if required or desirable, three or more liquor outlets may be connected with the reactor 10 in order to ensure that the liquor at any point in the reactor 10 is withdrawn at an appropriate time in order to minimize the opportunity for the cooking liquor to produce undesirable degraded products.

Figure 4:
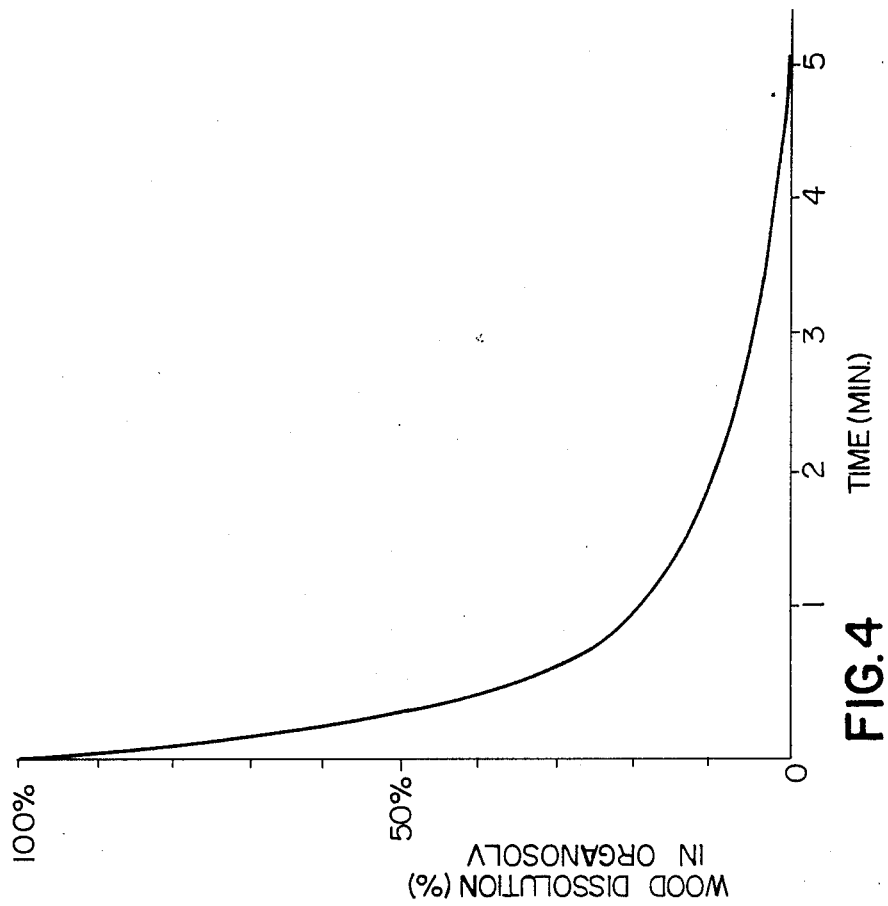
FIG. 4 represents a graph demonstrating rate of lignocellulose dissolution in organosolve liquor over time.

FIG. 4 illustrates a chart which depicts the percentage of lignocellulose dissolution in cooking liquor which takes place over a given period of time. Lignocellulose dissolution is plotted on the Y axis, while time is plotted on the X axis. As can be seen, the initial rate of dissolution is rapid as relatively easily dissolved components such as lignin and hemicellulose products go into solution. The less soluble components of the woodchips, such as glucosan and highly ordered cellulose, take longer to go into solution and hence the curve after the initial rapid drop begins to level out over time. Theoretically, the reactor 10 volume will correspond to the integrated area under the curve. Empirically, the reactor 10 volume would not normally exceed about 2 to 4 times the volume of woodchips introduced into the reactor per minute.

Figure 5:
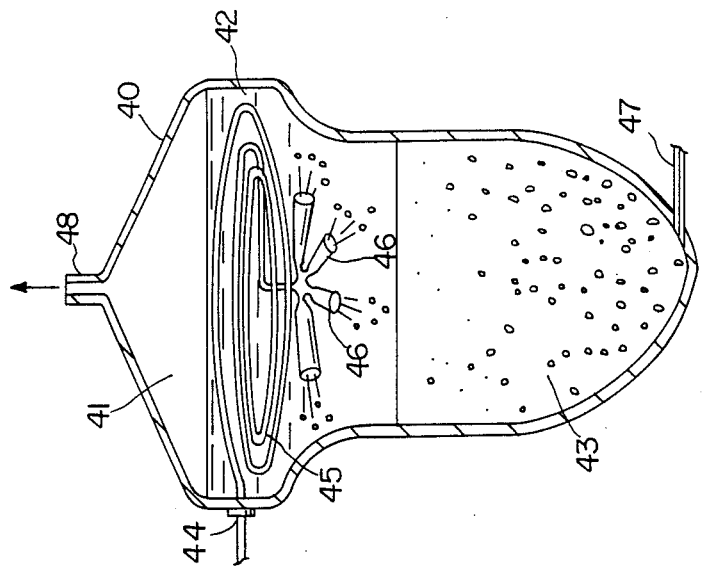
FIG. 5 represents a partial section side view of a released liquor cooling and secondary hydrolysis vessel.

FIG. 5 illustrates a cooling and secondary hydrolysis vessel 40 which can be connected at the liquor outlet 16 of the reactor 10 to (1) recover heat from the cooking liquor; (2) provide a temporary liquor releasing zone to enable the liquor to maintain an organic solvent concentration of approximately the same level as outlet 16, and to facilitate the secondary hydrolysis of the oligomer sugars contained in the released liquor by using the acid originated from the liquor. Additional hydrolysis vessels 40 can be connected to liquor outlet 24 in FIG. 2 and outlet 32 in FIG. 3. The vessel 40 has an evaporation zone 41, an initial cooling zone 42 and a secondary hydrolysis zone 43. Liquor from outlet 16 is introduced into the vessel 40 through inlet 44. Typically, the temperature of the liquor at this point will be at about 180° C. The liquor passes through a spiral coil 45 wherein it is rapidly cooled due to transfer of heat into the evaporation zone 41. The liquor is expelled through one of several flared outlets 46. These outlets 46 are flared to discourage liquor solidification by temporarily maintaining an organic solvent concentration which holds the lignin in solution. The temperature of the liquor expelled from the outlets 46 would typically be about 120° C.

In the lower hydrolysis zone 43 of the vessel 40, secondary hydrolysis of the liquor takes place. The temperature of the liquor in the secondary hydrolysis zone would typically be about 90° C. Precipitated liquor and sugar solution are withdrawn from outlet pipe 47. The vapour from the evaporation zone 41, which typically would be higher in organic solvent concentration than the liquor, is withdrawn through outlet 48 and taken to a conventional vapour condensation and recovery unit for reuse in the process. In the vessel 40, the temperature is typically coolest (90° C.) at the bottom region of the vessel 40, and hottest (120° C.) at the top region of the vessel 40. Moreover, organic solvent concentration is higher in the initial cooling zone 42 than it is in the secondary hydrolysis zone 43.

EXAMPLE

Aspen woodchips are introduced into the reactor 10 continuously at a rate of 100 g (dry weight equivalent) per minute. The woodchips had about a 45% oven dry weight (ODW) moisture content. 700 ml. of acetone/water mixture containing 0.04M $H_2SO_4$ was continuously introduced into the opposite end of the reactor, in a direction countercurrent to the flow of the woodchips. The capacity of the reactor was 1.5 liters and it measured approximately 8 cm. in diameter and 30 cm. in length.

The liquor containing dissolved compounds was continuously withdrawn from the end of the reactor 10 where the woodchips were being introduced. The rate of withdrawal of liquor from the outlet balanced with the rate of fresh cooking liquor and woodchips being introduced into the reactor 10. At any given time, the liquor withdrawn from the reactor 10 contained 99.5% of the wood components in dissolved form. The dissolved components of various molecular sizes could be recovered by cooling the withdrawn liquor and subjecting it to conventional liquid separation techniques.

An analysis of 100 g of the Aspen woodchips indicated that the woodchips contained 19 g lignin, 57 g glucosan, 22 g xylan, mannan, arabinan and 2 g extractives.

The reaction vessel can be vertically oriented and rely upon natural movement of the cellulose particles as shown in FIGS. 1 to 3. Alternatively, an archemedes screw or other particle conveying means can be used in a horizontally oriented reactor to ensure movement and proper dispersion of the particles in the cooking liquor. Such equipment is well known to those skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. In a method for continuous organosolv treatment of a comminuted lignocellulose material containing naturally occurring water in a reaction vessel, wherein the lignocellulose material is contacted at elevated temperatures with a mixture of an organic solvent, water and a catalytic amount of an acid as a cooking liquor which facilitates the dissolution of the lignocellulose material, the improvement which comprises:
   (a) introducing the lignocellulosic material into the vessel through a first inlet in countercurrent flow to the cooking liquor such that in a first zone of the vessel mainly lignin and hemicellulosic sugars are dissolved from the lignocellulosic material leaving a remaining cellulose and such that in a second zone of the vessel spaced from the first zone mainly oligomeric sugars are formed from the remaining cellulose;
   (b) introducing the cooking liquor through a second inlet into the second zone in the vessel in countercurrent flow to the lignocellulosic material at a first temperature $T_1$ in the vessel and removing the cooling liquor in the first zone from a first outlet from the vessel at a temperature $T_2$ lower than $T_1$, wherein the water in the comminuted lignocellulosic material introduced into the first zone dilutes the cooking liquor and provides the temperature $T_1$ for dissolution of the lignin and hemicelluloses in the first zone which are removed from the first zone through the first outlet; and
   (c) rapidly cooling the cooking liquor after removing the cooking liquor from the vessel wherein the lignin remains dissolved in the cooking liquor during the cooling.

2. The method of claim 1 wherein a portion of the cooking liquor is removed from an intermediate outlet of the vessel between the first and second zones such that essentially oligomeric sugars are removed through the intermediate outlet and then are rapidly cooled.

3. The method of claim 2 wherein in addition cooking liquor is introduced through an intermediate inlet between the first and second zones and wherein the intermediate inlet is closer to the first zone than the intermediate outlet.

4. The method of claim 3 wherein the cooking liquor introduced into the intermediate inlet has a different organic solvent to water ratio or temperature than the cooking liquor introduced to the first inlet to the vessel such that removal of the hemiculluloses and lignin in the first zone is facilitated.

5. The method of claim 1 wherein additional intermediate inlets, outlets or combinations thereof are provided between the first and second zones.

6. The method of claim 1 wherein the lignocellulosic material is wood containing between 30 and 70 weight percent naturally occurring water.

7. A method of dissolving lignin and sugar substances from comminuted lignocellulosic material at elevated temperatures and pressures comprising:
   (a) introducing comminuted lignocellulosic material into a reaction vessel;
   (b) introducing a cooking liquor comprising a major proportion of organic solvent, a minor proportion of water, and a catalytically effective amount of inorganic acid into the reaction vessel;
   (c) causing the comminuted lignocellulosic material to be contacted by and dissolved in the cooking liquor wherein the flow of cooking liquor is countercurrent to the flow of lignocellulosic material;
   (d) withdrawing cooking liquor from the reaction vessel after the liquor has hydrolyzed and dissolved a substantial amount of the sugars, lignin and other substances in the comminuted lignocellulosic material; and
   (e) rapidly cooling the cooking liquor wherein the lignin remains dissolved in the cooking liquor during the cooling.

8. A method according to claim 7 wherein the method is conducted at temperatures ranging from 150° C. to 210° C.

9. A method according to claim 7 wherein the proportion of organic solvent in the cooking liquor introduced into the reaction vessel is 70 to 90 percent by volume of the cooking liquor.

10. A method according to claim 7 wherein the proportion of organic solvent in the cooking liquor introduced into the reaction vessel is about 80 percent by volume of the cooking liquor.

11. A method according to claim 7 wherein the water content of the comminuted lignocellulose material introduced into the reaction vessel is in the range 30 to 70 percent by weight of the comminuted cellulose material, and wherein the water content of the lignocellulosic material decreases as the material moves through the reactor.

12. A method according to claim 7 wherein the temperature of the cooking liquor introduced into the reaction vessel is about 200° C. which is maintained at a second zone of the reactor and decreases to 180° C. at a first zone of the reactor.

13. A method according to claim 7 wherein the time during which the comminuted lignocellulosic material is in contact with the cooking liquor is in the range of about 2 to about 5 minutes.

14. A method according to claim 7 wherein the ratio by weight of cooking liquor to comminuted lignocellulosic material introduced into the reaction vessel is in the range 5:1 to 15:1.

* * * * *

UNITED STATES PATENT AND TRADEMARK OFFICE
CERTIFICATE OF CORRECTION

PATENT NO. : 4,941,944
DATED : July 17, 1990
INVENTOR(S) : Robert P. Chang

It is certified that error appears in the above—identified patent and that said Letters Patent is hereby corrected as shown below:

In the Abstract, line 7, "mositure" should be --moisture--.

Column 1, line 7 "Ser. No. 212,784" should be --Ser. No. 712,784--.

Column 2, line 60, after "horizontally", --or-- should be inserted.

Column 4, line 10 "organosolve" should be --organosolv--.

Column 8, line 22 "as" should be --at--.

Column 8, line 29, "Refer ring" should be --Referring--.

Column 10, line 37 "cooling" should be --cooking--.

Signed and Sealed this

Eleventh Day of February, 1992

Attest:

HARRY F. MANBECK, JR.

*Attesting Officer*   *Commissioner of Patents and Trademarks*